(12) United States Patent
Cantatore et al.

(10) Patent No.: US 8,083,623 B2
(45) Date of Patent: Dec. 27, 2011

(54) SHOE TENSIONER FOR A SYNCHRONOUS BELT DRIVE FOR USE WITH OIL

(75) Inventors: Michele Cantatore, Turin (IT); Franco Cipollone, Chieti (IT)

(73) Assignee: Dayco Europe S.R.L. con Unico Socio, Chieti (IT)

( * ) Notice: Subject to any disclaimer, the term of this patent is extended or adjusted under 35 U.S.C. 154(b) by 706 days.

(21) Appl. No.: 11/989,523

(22) PCT Filed: Jul. 29, 2005

(86) PCT No.: PCT/IT2005/000455
§ 371 (c)(1),
(2), (4) Date: Nov. 20, 2008

(87) PCT Pub. No.: WO2007/013111
PCT Pub. Date: Feb. 1, 2007

(65) Prior Publication Data
US 2009/0105022 A1    Apr. 23, 2009

(51) Int. Cl.
*F16H 7/08* (2006.01)

(52) U.S. Cl. .................. 474/111; 474/109; 474/128

(58) Field of Classification Search .................. 474/109, 474/111, 128, 133–135
See application file for complete search history.

(56) References Cited

U.S. PATENT DOCUMENTS

| | | | | |
|---|---|---|---|---|
| 3,148,555 A * | 9/1964 | Peras | ............................. | 474/111 |
| 4,696,663 A * | 9/1987 | Thomey et al. | ................ | 474/133 |
| 5,277,667 A * | 1/1994 | Gardner et al. | ................ | 474/135 |
| 5,647,812 A | 7/1997 | McDonald | | |
| 6,231,465 B1 * | 5/2001 | Quintus | ......................... | 474/133 |
| 6,312,353 B1 * | 11/2001 | Oba | ............................... | 474/140 |
| 6,428,435 B1 * | 8/2002 | Kumakura et al. | ............ | 474/111 |

FOREIGN PATENT DOCUMENTS

| | | |
|---|---|---|
| DE | 1238299 | 4/1967 |
| GB | 1085213 | 9/1967 |

* cited by examiner

*Primary Examiner* — Emmanu M Marcelo
(74) *Attorney, Agent, or Firm* — Davidson Berquist Jackson & Gowdey, LLP

(57) ABSTRACT

A shoe tensioner for a synchronous belt drive, having a guide member adapted to cooperate with a drive belt and hinged at one end about a first axis; elastic means cooperating with the guide member to tension the belt; and connecting means for connecting the tensioner to a supporting wall. More specifically, the elastic means include a coil spring.

9 Claims, 2 Drawing Sheets

SHOE TENSIONER FOR A SYNCHRONOUS BELT DRIVE FOR USE WITH OIL

TECHNICAL FIELD

The present invention relates to a shoe tensioner for a synchronous belt drive for use with oil.

BACKGROUND ART

For in-oil applications, synchronous chain drive shoe tensioners are known comprising a leaf spring rotating about a fixed axis, and a guide shoe supported by the leaf spring and cooperating in contact with a chain. More specifically, the leaf spring comprises a first end portion hinged about the fixed axis, and a second end portion opposite the first and cooperating with a position-adjustable stop member, which pushes the guide shoe against the chain to tension the convex elastic member.

Shoe tensioners are not generally used in dry drives, such as conventional belt drives, on account of the severe wear and belt damage caused by friction of the shoe.

Synchronous drives have recently been designed comprising in-oil belts, in which known shoe tensioners have proved extremely sensitive to distortion of the belt, which is normally greater than that of a chain. Distortion may be caused, for example, by variations in operating temperature, and has been found to be poorly compensated by known shoe tensioners, thus resulting in widely varying tension of the belt, which impairs meshing conditions of the drive pulleys and results in anomalous operation of the drive.

DISCLOSURE OF INVENTION

It is an object of the present invention to provide a synchronous belt drive shoe tensioner which is free of the aforementioned drawbacks.

According to the present invention, there is provided a shoe tensioner as claimed in Claim 1.

BRIEF DESCRIPTION OF THE DRAWINGS

A preferred, non-limiting embodiment of the present invention will be described by way of example with reference to the accompanying drawings, in which.

BEST MODE FOR CARRYING OUT THE INVENTION

Figure 1:
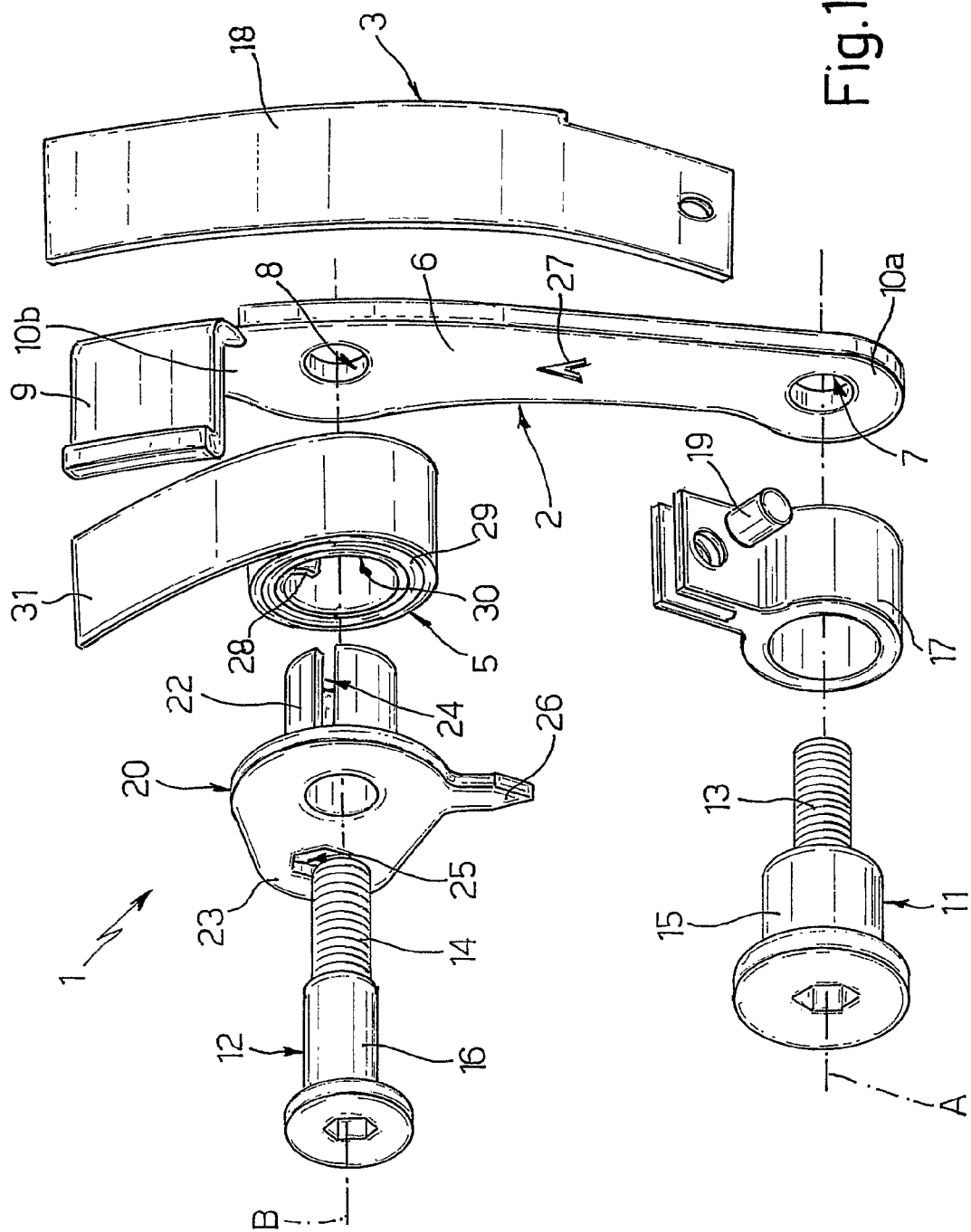
FIG. 1 shows an exploded view in perspective of a shoe tensioner in accordance with the present invention.
Figure 3:
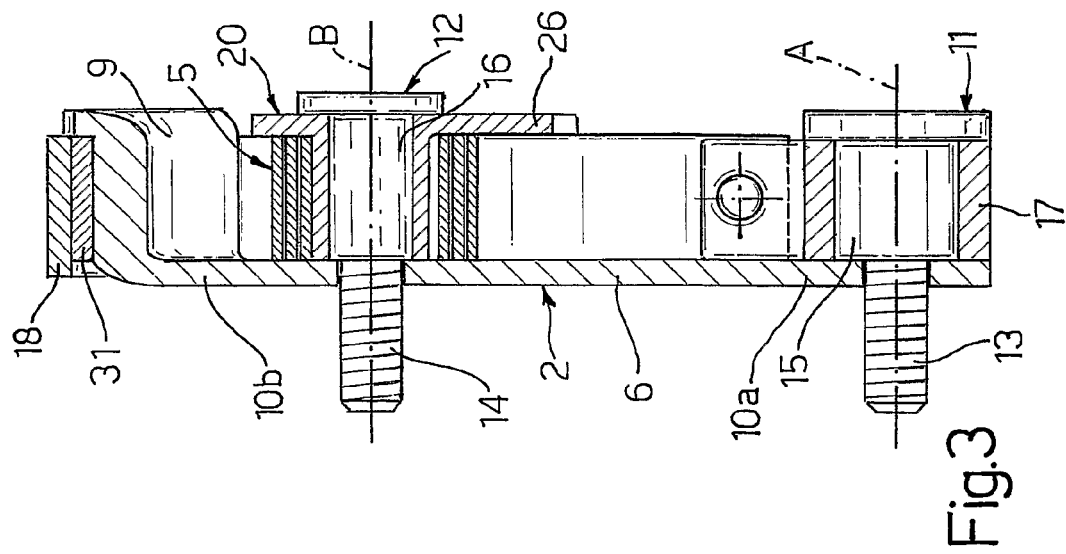
FIG. 3 shows a longitudinal section of the tensioner along line III-III in FIG. 2.
Figure 2:
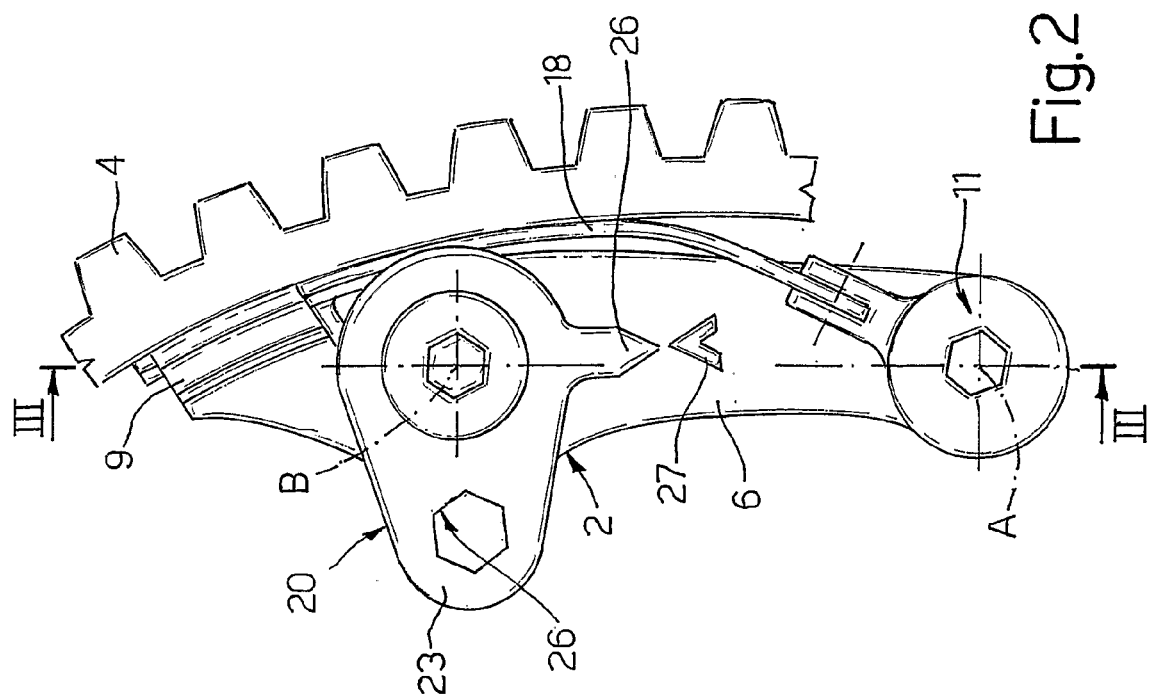
FIG. 2 shows a side view of FIG. 1.

FIG. 1 shows a shoe tensioner 1 comprising an elongated support 2 adapted to be connected rigidly to a wall of an internal combustion engine (not shown); a guide member 3 adapted to cooperate with a toothed belt 4 for an in-oil, e.g. timing drive, application; and a spiral spring 5 which cooperates with guide member 3 to tension toothed belt 4.

More specifically, elongated support 2 comprises, integrally, a plate 6 defining two holes 7, 8; and a bent bracket 9 located on the opposite side of guide member 3 to toothed belt 4 and defining a fixed stop for guide member 3. At opposite ends, plate 6 comprises a first end portion 10a defining hole 7; and a second end portion 10b connected to bracket 9 and defining hole 8.

Elongated support 2 is connected to the internal combustion engine wall by two screws 31, 12 housed respectively inside holes 7, 8 and comprising respective threaded portions 13, 14, and respective cylindrical centering portions 15, 16.

Centering portion 15 of screw 11 defines an axis A through hole 7, and fits to guide member 3 to define a hinge coupling. More specifically, guide member 3 comprises a collar 17 fitted in freely rotating, axially fixed manner to centering portion 15; and a curved, substantially rigid shoe 18 having an end portion connected removably to collar 17 by a lock pin 19.

At the opposite end, with respect to axis A, of elongated support 2, centering portion 16 defines an axis B through hole 8, and supports spiral spring 5 by means of a fastening member 20 fitted in rotary manner to centering portion 16 and locked rigidly once screw 12 is tightened.

More specifically, fastening member 20 comprises a bush 22 fitted radially to centering portion 16; and an arm 23 connected rigidly to a radial end of bush 22.

Bush 22 defines a longitudinal slit 24 fitted rotationally to spring 5, and arm 23 defines a hexagonal seat 25 at a distance from axis B, and a pointer defined by a radial projection 26, which is adapted to be aligned with a reference mark 27 carried by plate 6 to define a predetermined optimum preload position of spiral spring 5.

Spiral spring 5 comprises, integrally, an end connecting portion 28 facing axis B and connected to longitudinal slit 24; an annular coil portion 29 defining a seat 30 for bush 22; and an end portion 31 projecting with respect to coil portion 29 and interposed between bracket 9 and curved shoe 18. More specifically, the turns of coil portion 29 at least partly contact one another to produce a damping force which tends to oppose movement of guide member 3.

To assemble tensioner 1, elongated support 2 is first placed on the engine wall, and screw 11 is tightened inside a threaded hole in the wall so that guide member 3 is hinged about axis A in an axially fixed position.

Fastening member 20 and spiral spring 5 are then aligned with axis B and connected to elongated support 2 by inserting screw 12 inside hole 8, with end portion 31 positioned between bracket 9 and curved shoe 18.

Using a tool inserted inside hexagonal seat 25, fastening member 20 is then rotated by arm 23 to align radial projection 26 with reference mark 27, and screw 12 is tightened to rigidly lock fastening member 20. As arm 23 is rotated, spiral spring 5 is tightened and pushes curved shoe 18 to tension toothed belt 4.

In actual use, end portion 31 acts on guide member 3 to tension belt 4, and the in-service movements imposed on end portion 31 are distributed along the length of end portion 31 and coil portion 29. Spiral spring 5 is therefore of limited stiffness and provides for limiting variations in the tension of belt 4.

The advantages of the tensioner according to the present invention are as follows.

Using a spring comprising appropriately sized turns induces a sufficiently high mean tension of belt 4, and at the same time provides for low stiffness capable of limiting variations in the tension of belt 4 within a range ensuring correct meshing of toothed belt 4. Coil springs also provide a simple way of damping the movement of guide member 3.

Rotary fastening member 20 allow the preload of spring 5 to be adjusted to a predetermined value at the assembly stage, and radial projection 26 gives an immediate indication of the desired setting, thus speeding up assembly.

Using screws 11, 12 to define the rotation axes of guide member 3 and fastening member 20 reduces the number of parts required, and removable curved shoe 18 can be replaced, e.g. when worn by friction with toothed belt 4, without having to replace the whole tensioner 1.

Moreover, bracket 9 supports both end portion 31 of spiral spring 5 and curved shoe 18, and defines a fixed support to support any overload of toothed belt 4, thus preventing damage to spring 5.

Clearly, changes may be made to tensioner 1 as described and illustrated herein without, however, departing from the scope of the present invention as defined in the accompanying Claims.

In particular, a helical spring may be used instead of a spiral spring; in which case, the travel of curved shoe 18 is again distributed along the length of the turns of the spring, thus limiting the variation in the tension of the spring and, therefore in the tension of toothed belt 4.

The invention claimed is:

1. A shoe tensioner for a synchronous belt drive, comprising a guide member adapted to cooperate with a drive belt and hinged at one end about a first axis (A); a spring cooperating with said guide member to tension said belt; a mounting member connecting said tensioner to a supporting wall; said spring having a first end portion connected to a fastening member carried by said mounting member and a second end portion opposite said first end portion and cooperating with said guide member; and a locking member for locking said fastening member angularly in a predetermined position, said fastening member comprising a lever arm and a coupling recess formed in said lever arm and adapted to cooperate with a tool to rotate said fastening member into said predetermined position in opposition to said spring.

2. A tensioner as claimed in claim 1, wherein said fastening member is rotatable to set the load of said spring.

3. A tensioner as claimed in claim 1, further including cooperating indicators showing said predetermined position.

4. A tensioner as claimed in claim 1, wherein said fastening member is housed partly inside a seat defined by said spring.

5. A tensioner as claimed in claim 1, wherein said mounting member comprises a support supporting said guide member and said spring, and having a stop member for limiting the angular movement of said guide member about said first axis (A).

6. A tensioner as claimed in claim 5, wherein said support is a plate integrally comprising a bent member defining said stop member.

7. A tensioner as claimed in claim 1, wherein said mounting member comprises a connecting member defining said axis (A) and for connecting said guide member to said wall.

8. A tensioner as claimed in claim 7, wherein said guide member comprises a collar connected to rotate about said connecting member; and a substantially rigid shoe adapted to cooperate directly with said belt and connected removably to said collar.

9. A tensioner as claimed in claim 7 wherein said mounting member further comprises a second connecting member for connecting said tensioner to said wall; said second connecting member being spaced apart from said first connecting member and being defined by said locking member.

* * * * *